United States Patent
Tailor et al.

(10) Patent No.: US 9,307,474 B1
(45) Date of Patent: Apr. 5, 2016

(54) FREQUENCY BAND SELECTION IN A WIRELESS COMMUNICATION SYSTEM

(71) Applicant: Sprint Spectrum LP, Overland Park, KS (US)

(72) Inventors: Pinalkumari Tailor, Ashburn, VA (US); Mohammad Ghaus, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 118 days.

(21) Appl. No.: 14/015,973

(22) Filed: Aug. 30, 2013

(51) Int. Cl.
*H04J 3/00* (2006.01)
*H04W 36/30* (2009.01)
*H04W 36/24* (2009.01)

(52) U.S. Cl.
CPC ............... *H04W 36/30* (2013.01); *H04W 36/24* (2013.01)

(58) Field of Classification Search
CPC .................................................... H04W 36/30
USPC .......................................................... 370/332
See application file for complete search history.

(56) References Cited

U.S. PATENT DOCUMENTS

| | | | | |
|---|---|---|---|---|
| 6,600,917 | B1 * | 7/2003 | Maupin | H04W 48/16 455/414.1 |
| 2007/0287473 | A1 * | 12/2007 | Dupray | H04W 4/02 455/456.1 |
| 2008/0233945 | A1 * | 9/2008 | Gummadi | H04W 64/006 455/422.1 |
| 2009/0180451 | A1 * | 7/2009 | Alpert et al. | 370/338 |
| 2010/0074220 | A1 * | 3/2010 | Jung et al. | 370/331 |
| 2011/0194427 | A1 * | 8/2011 | Shirota et al. | 370/252 |
| 2011/0319085 | A1 * | 12/2011 | Ishii et al. | 455/436 |

* cited by examiner

*Primary Examiner* — Samina Choudhry (57) ABSTRACT

In systems and method of frequency band selection, a mobility and an application requirement of an application running on a wireless device are determined for a wireless device in communication with an access node over a first frequency band using a first radio access technology. When it is detecting that a signal level of the first frequency band meets a handover criteria, a message is sent to the wireless device comprising information of a second frequency band and a third frequency band, wherein the second and third frequency bands use a second radio access technology. The wireless device is instructed to communicate with the access node using one of the second and third frequency bands based on the determined mobility and application requirement.

16 Claims, 5 Drawing Sheets

FREQUENCY BAND SELECTION IN A WIRELESS COMMUNICATION SYSTEM

TECHNICAL BACKGROUND

In a wireless communication network which supports multiple radio access technologies, a wireless device communicating with the network can transition among radio access technologies. The transition may be due to various reasons, including the wireless device moving beyond the effective range of a signal using a particular radio access technology, the unavailability of a certain radio access technology at a particular access node, a drop-off in a signal using a particular radio access technology below a certain threshold level, a decline in a throughput of a particular radio access technology below a threshold, and the like. A smooth transition from one radio access technology to another radio access technology is vital for wireless device communication, in particular when the wireless device is involved in a voice or data communication session during the transition.

Overview

In systems and methods of frequency band selection in a wireless communication system, a mobility and an application requirement of an application running on a wireless device are determined for a wireless device in communication with an access node over a first frequency band using a first radio access technology. When it is detected that a signal level of the first frequency band meets a handover criteria, a message is sent to the wireless device, the message comprising information of a second frequency band and a third frequency band. The second the third frequency bands use a second radio access technology. Based on the determined mobility and application requirement, the wireless device is instructed to communicate with the access node using one of the second and third frequency bands

DETAILED DESCRIPTION

Figure 1:
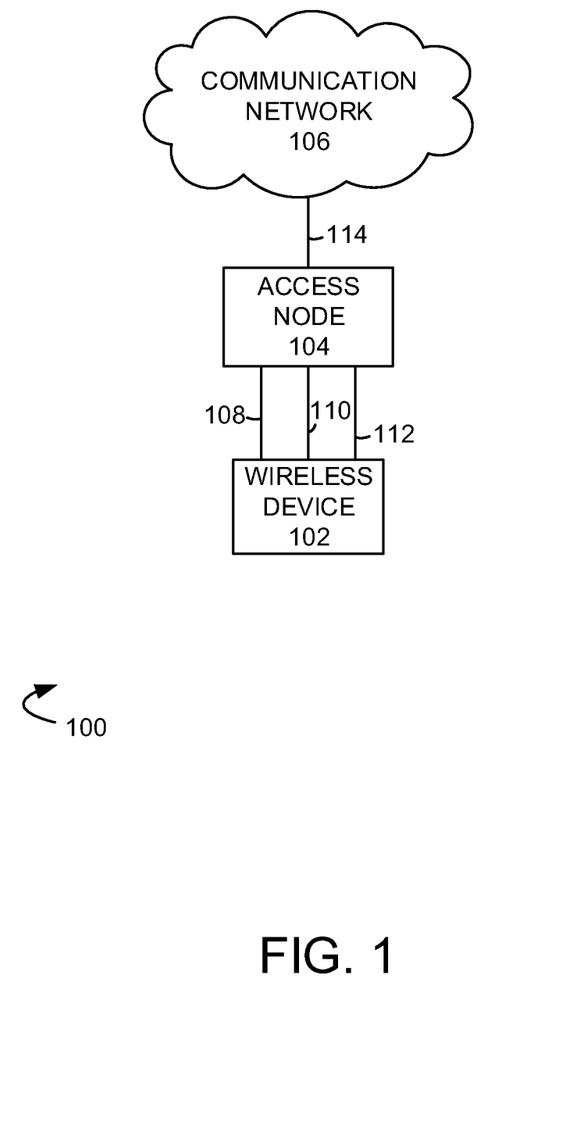
FIG. 1 illustrates an exemplary communication system for frequency band selection.

FIG. 1 illustrates an exemplary communication system 100 of access node selection comprising wireless device 102, access node 104, and communication network 106. Examples of wireless device 102 can comprise a cell phone, a smart phone, a computing platform such as a laptop, palmtop, or tablet, a personal digital assistant, or an internet access device, including combinations thereof. Wireless device 102 can communicate with access node 104 over communication links 108, 110 and 112. Each of communication links 108, 110 and 112 can comprise a channel or a frequency band, and further can each use a different radio access technology. For example, communication link 108 can use a first radio access technology, and communication links 110 and 112 can use a second radio access technology. In an embodiment, communication link 110 is a primary channel of the second radio access technology, and communication link 112 is a secondary channel of the second radio access technology.

Access node 104 is a network node capable of providing wireless communications to wireless device 102, and can be, for example, a base transceiver station, a radio base station, an eNodeB device, or an enhanced eNodeB device. Access node 104 is in communication with communication network 106 over communication link 114.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying voice information and other data, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 106 comprise Ethernet, Fast Ethernet, Gigabit Ethernet, LocalTalk (such as Carrier Sense Multiple Access with Collision Avoidance), Token Ring, Fiber Distributed Data Interface (FDDI), and Asynchronous Transfer Mode (ATM). Communication network 106 may also comprise a wireless network, including base stations, wireless communication nodes, telephony switches, internet routers, network gateways, computer systems, communication links, or some other type of communication equipment, and combinations thereof.

Communication links 108, 110, 112 and 114 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

A wireless device communicating with a network which supports more than one radio access technology can typically transition among the supported radio access technologies. The transition may be due to various reasons, including the wireless device moving beyond the effective range of a signal using a particular radio access technology, the unavailability of a certain radio access technology at a particular access node, a drop-off in a signal using a particular radio access technology below a certain threshold level, a decline in a throughput of a particular radio access technology below a threshold, and the like. However, a communication system may instruct a wireless device to transition from a first channel using a first radio access technology to a second channel using a second radio access technology without confirmation that the wireless device can actually establish communication over the channel using the second radio access technology. In such case, a communication session and related connections between the wireless device and the communication system using the first radio access technology can be torn down before a communication session is established using the second radio access technology, and further, the establishment of a communication session using the second radio access technology can fail, forcing the wireless device to scan for another available channel, and causing delay in re-establishing network communication for the wireless device.

In operation, wireless device 102 is in communication with access node 104 over a first frequency band using a first radio access technology, and a mobility and an application requirement of an application running on wireless device 102 are determined. When it is detected that a signal level of the first frequency band meets a handover criteria, a message is sent to the wireless device comprising information of a second frequency band and a third frequency band, where each of the second and third frequency bands use a second radio access technology. Based on the determined mobility and application requirement, the wireless device is instructed to communicate with the access node using one of the second and third frequency bands.

Figure 2:
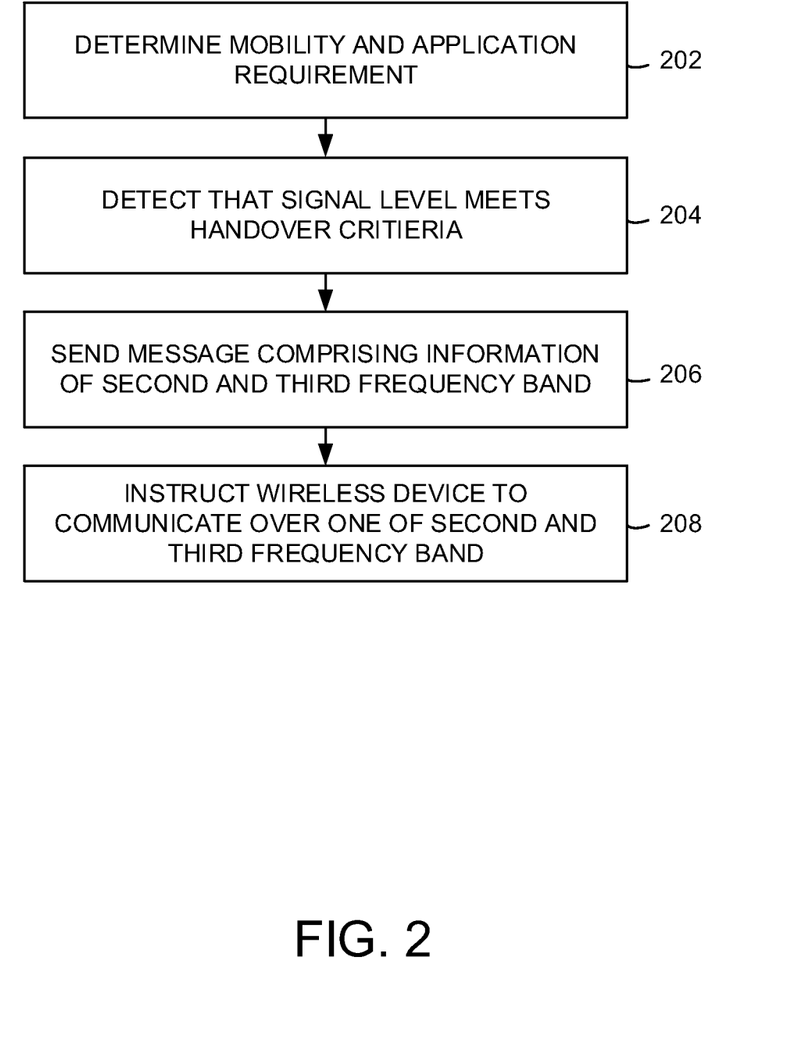
FIG. 2 illustrates an exemplary method of frequency band selection.

FIG. 2 illustrates an exemplary method of frequency band selection. In operation 202, a mobility and an application requirement of an application running on a wireless device are determined, wherein the wireless device is in communication with an access node over a first frequency band using a first radio access technology. For example, wireless device 102 can be in communication with access node 104 over a first frequency band (e.g., communication link 108) using a first frequency band. The mobility can comprise a location of the wireless device, a direction of motion over time, and/or a speed of motion over time of the wireless device. The mobility can be determined based on, for example, GPS information of the wireless device, or by base station triangulation, or the mobility can be reported to access node 104 by wireless device 102. The mobility can further be determined based on a modulation and coding scheme assigned to communication link 108, or based on changes to the assigned modulation and coding scheme, as a lower modulation and coding scheme can be correlated with a wireless device located near a coverage area edge of, or moving away from, an access node. The application requirement can comprise a minimum data rate, a maximum permitted data delay, a minimum throughput, a maximum error rate, a maximum data loss rate, and the like, which can be required by the application running on wireless device 102 to achieve a minimum level of performance. The application requirement can also be determined based on the application type, such as whether the application is a relatively delay sensitive application (such as a streaming audio application, a streaming video application, a voice application, and the like) or a relatively delay insensitive application (such as an email application, a messaging application, a web browsing application, and the like). Further, the application requirement can be based on a traffic class indicator associated with the application, such as a quality of service class indicator (QCI) or similar traffic class indicator.

It is detected that a signal level of the first frequency band meets a handover criteria (operation 204), and a message is sent to the wireless device, the message comprising information of a second frequency band and a third frequency band, wherein the second and third frequency bands use a second radio access technology (operation 206). For example, when it is determined that a signal level of communication link 108 meets a handover criteria, a message can be sent to wireless device 102 including information about communication links 110 and 112, which use a second radio access technology. The signal level can comprise, for example, a signal to noise ratio (SNR), a signal to interference plus noise ratio (SINR), a carrier to interference plus noise ratio (CINR), a received signal strength indicator (RSSI), a reference signal received power (RSRP), and the like. The signal level can further comprise a channel quality indicator (CQI), a reference signal received quality (RSRQ), a received signal quality indicator (RSQI), and the like. The handover criteria can comprise a threshold signal level, which can further comprise a hysteresis or other adjustment to the received signal level. The first radio access technology can comprise a higher speed radio access technology than the second radio access technology. For example, the first radio access technology can comprise WiMAX, LTE, LTE-Advanced, or another so-called fourth generation (4G) radio access technology, and the second radio access technology can comprise CDMA, EV-DO, 1×RTT, GSM, or another so-called third generation (3G) radio access technology. In an embodiment, the message sent to the wireless device can comprise a system information block message, such as a SIB 8 message or a similar message, comprising information of a second frequency band and a third frequency band.

Based on the determined mobility and application requirement, the wireless device is instructed to communicate with the access node using one of the second and third frequency bands (operation 208). For example, wireless device 102 can be instructed to communicate with access node 104 over communication link 110 or communication link 112, based on the determined mobility of wireless device 102 and on the application requirement of an application running on wireless device 102. In an embodiment, the second frequency band (e.g., communication link 110) can comprise a primary frequency band of the second radio access technology and the third frequency band (e.g., communication link 112) can comprise a secondary frequency band of the second radio access technology. In such case, wireless device 102 can be instructed to communicate with access node 104 over the primary frequency band or the secondary frequency band based on the determined mobility and application requirement.

Figure 3:
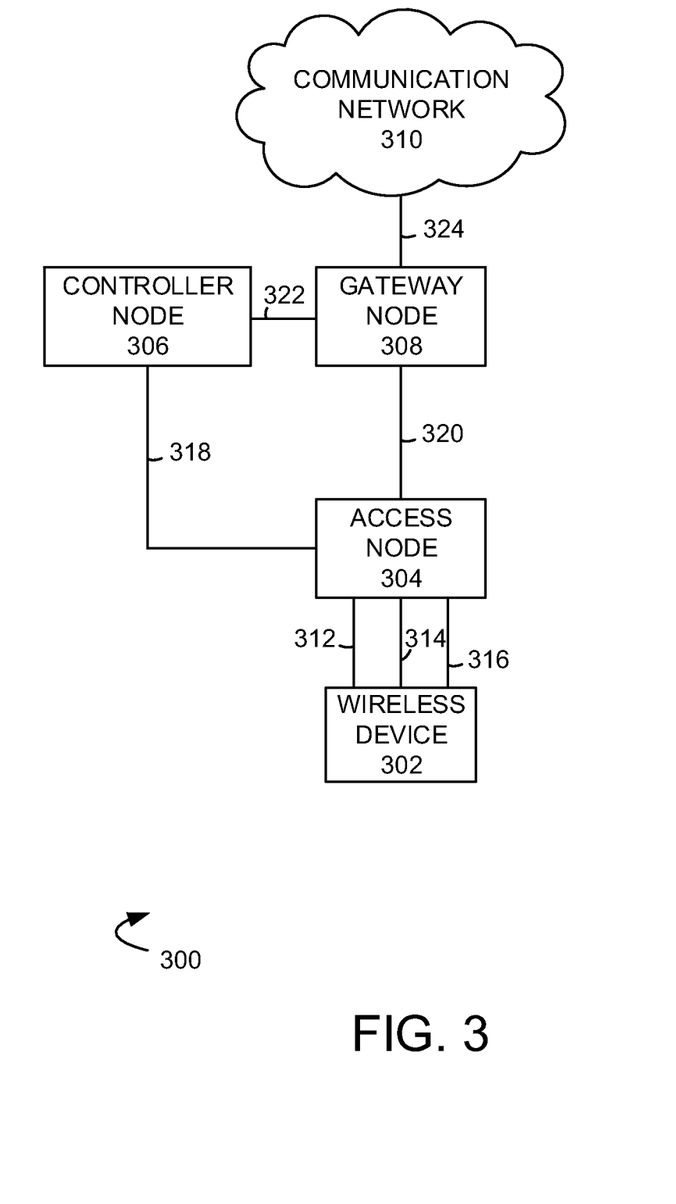
FIG. 3 illustrates another exemplary communication system for frequency band selection.

FIG. 3 illustrates another exemplary communication system 300 for frequency band selection comprising wireless device 302, access node 304, controller node 306, gateway node 208, and communication network 310. Examples of wireless device 302 can comprise a cell phone, a smart phone, a computing platform such as a laptop, palmtop, or tablet, a personal digital assistant, or an internet access device, including combinations thereof. Wireless device 302 can communicate with access node 304 over communication links 312, 314 and 316. Each of communication links 312, 314 and 316 can comprise a channel or a frequency band, and further can each use a different radio access technology. For example, communication link 312 can use a first radio access technology, and communication links 314 and 316 can use a second radio access technology. In an embodiment, communication link 314 is a primary channel of the second radio access technology, and communication link 316 is a secondary channel of the second radio access technology.

Access node 304 is a network node capable of providing wireless communications to wireless device 302, and can be, for example, a base transceiver station, a radio base station, an eNodeB device, or an enhanced eNodeB device. Access node 304 is in communication with controller node 306 over communication link 320, and with gateway node 308 over communication link 320.

Controller node 306 can comprise a processor and associated circuitry to execute or direct the execution of computer-readable instructions, and can be configured to control the setup and maintenance of a communication session over communication network 310 for wireless device 302, as well as to maintain network connection information associated with wireless device 302. Controller node 306 can comprise a mobile switching center (MSC), a dispatch call controller (DCC), a mobility management entity (MME), or another similar network node. Controller node 306 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 306 can receive instructions and other input at a user interface. Controller node 306 is in communication with gateway node 308 over communication link 322.

Gateway node 308 can comprise a processor and associated circuitry to execute or direct the execution of computer-readable instructions, and can be configured to maintain network connection information associated with wireless device 302. Gateway node 308 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 308 can receive instructions and other input at a user interface. Examples of gateway node 308 can include a standalone computing device, a computer system, or a network component, such as an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, and a network gateway, including combinations thereof. Gateway node 308 is in communication with communication network 310 over communication link 324.

Communication network 310 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 310 can be capable of carrying voice information and other data, for example, to support communications by a wireless device such as wireless device 302. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 310 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 310 may also comprise a wireless network, including base stations, wireless communication nodes, telephony switches, internet routers, network gateways, computer systems, communication links, or some other type of communication equipment, and combinations thereof.

Communication links 312, 314, 316, 318, 320, 322 and 324 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 304, controller node 306, gateway node 308 and communication network 310 which are omitted for clarity, including additional processing nodes, routers, gateways, and physical and/or wireless data links for carrying data among the various network elements.

Figure 4:
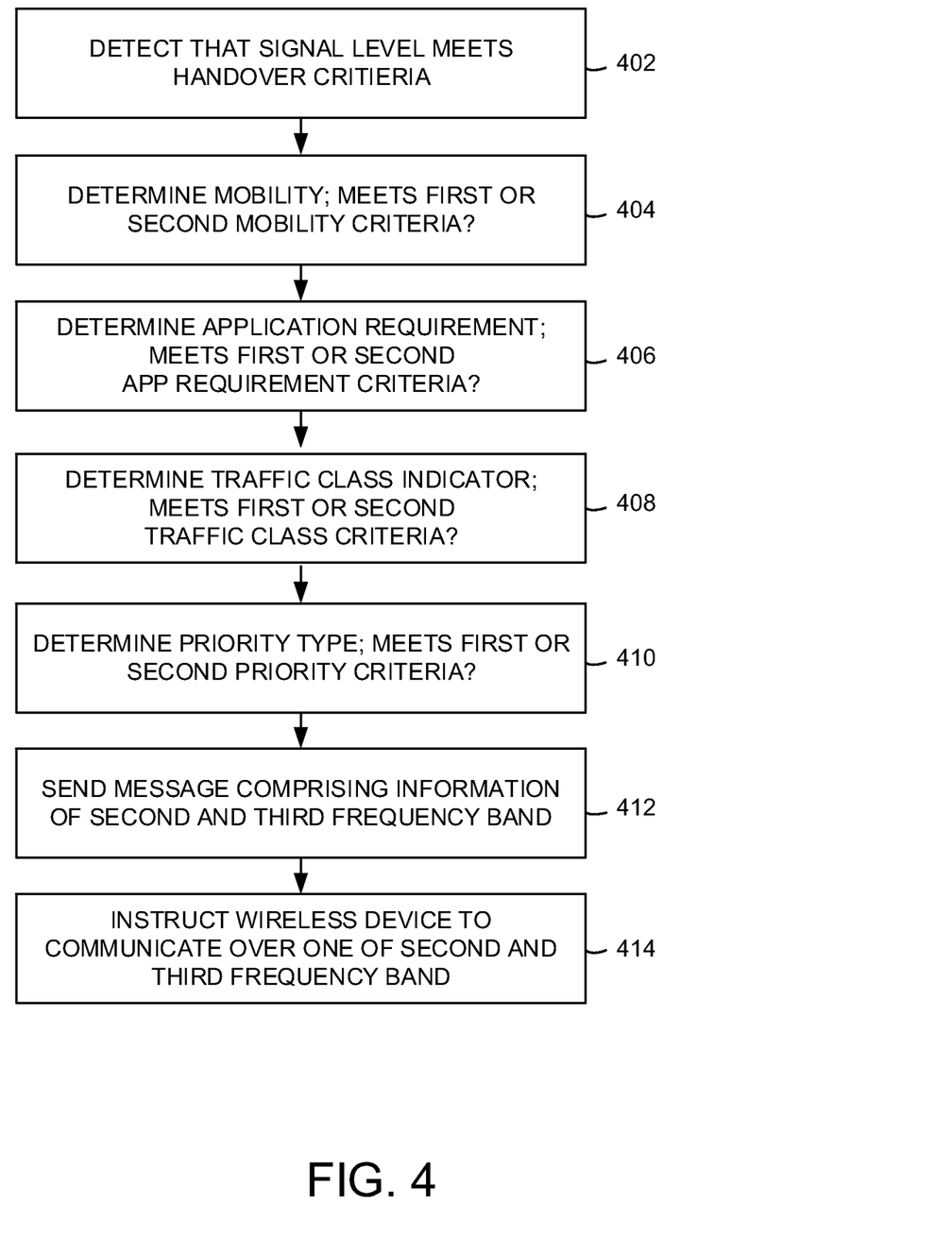
FIG. 4 illustrates another exemplary method of frequency band selection.

FIG. 4 illustrates another exemplary method of frequency band selection. It is detected that a signal level of the first frequency band meets a handover criteria (operation 402). The signal level can comprise, for example, a signal to noise ratio (SNR), a signal to interference plus noise ratio (SINR), a carrier to interference plus noise ratio (CINR), a received signal strength indicator (RSSI), a reference signal received power (RSRP), and the like. The signal level can further comprise a channel quality indicator (CQI), a reference signal received quality (RSRQ), a received signal quality indicator (RSQI), and the like. The handover criteria can comprise a threshold signal level, which can further comprise a hysteresis or other adjustment to the received signal level.

A mobility is determined for the wireless device, and it is determined whether the mobility meets a first mobility criteria or a second mobility criteria (operation 404). The mobility can comprise a location of the wireless device, a direction of motion over time, and/or a speed of motion over time of the wireless device. The mobility can be determined based on, for example, GPS information of the wireless device, or by base station triangulation, or the mobility can be reported to access node 304 by wireless device 302. The mobility can further be determined based on a modulation and coding scheme assigned to communication link 312, or based on changes to the assigned modulation and coding scheme, as a lower modulation and coding scheme can be correlated with a wireless device located near a coverage area edge of, or moving away from, an access node. The mobility can meet the first mobility criteria when the mobility meets or exceeds a mobility threshold, such as a threshold location of the wireless device relative to the access node, a threshold direction of motion over time, and/or a threshold speed of motion over time of the wireless device, and the like. The mobility can meet the second mobility criteria when the mobility is less than a mobility threshold.

Next, an application requirement is determined for the wireless device, and it is determined whether the application requirement meets a first application requirement criteria or a second application requirement criteria (operation 406). The application requirement can comprise a minimum data rate, a maximum permitted data delay, a minimum throughput, a maximum error rate, a maximum data loss rate, and the like, which can be required by the application running on wireless device 102 to achieve a minimum level of performance. The application requirement can also be determined based on the application type, such as whether the application is a relatively delay sensitive application (such as a streaming audio application, a streaming video application, a voice application, and the like) or a relatively delay insensitive application (such as an email application, a messaging application, a web browsing application, and the like). The application requirement can meet the first application requirement criteria when the application requirement meets or exceeds a threshold data rate, permitted data delay, throughput, error rate, data loss rate, and the like, or where the application comprises a relatively delay sensitive application. The application requirement can meet the second application requirement criteria when the application requirement is less than a threshold data rate, permitted data delay, throughput, error rate, data loss rate, and the like, or where the application comprises a relatively delay insensitive application.

A traffic class indicator is then determined for the wireless device, and it is further determined whether the traffic class indicator meets a first traffic class criteria or a second traffic class criteria (operation 408). The traffic class indicator can be associated with data traffic sent to or from the application running on wireless device 302, such as a quality of service class indicator (QCI) or similar traffic class indicator. The traffic class indicator can meet the first traffic class criteria when the traffic class indicator meets or exceeds a threshold traffic class, such as when the data traffic is associated with a guaranteed bit rate or a similar routing priority. The traffic class indicator can meet the second traffic class criteria when the application requirement is less than a threshold traffic class, such as when the data traffic is associated with a non-guaranteed bit rate or a similar routing priority.

Next, a priority type is determined for the wireless device, and it is determined whether the priority type meets a first priority criteria or a second priority criteria (operation 410). The priority can comprise a level of priority provisioned within communication system 300 for each wireless device, such as may be associated with a premium-level subscriber, a corporate subscriber, a consumer subscriber, an emergency responder subscriber, a civilian subscriber, and the like. For example, wireless devices 502 and 504 can comprise a threshold level of priority, and can be selected as candidates for the second handover. The priority type can meet the first priority criteria when the priority type meets or exceeds a priority threshold, such we when the priority type comprises at least a certain level of priority. The priority type can meet the second priority threshold when the priority type is less than a priority threshold. Examples of a priority type which meets the first priority criteria include a premium-level subscriber, a corporate subscriber, an emergency responder subscriber, and the like. Examples of a priority type which meets the second priority criteria include a consumer subscriber and a civilian subscriber (i.e., a non-emergency responder subscriber), and the like. Other priority types are also possible, including combinations of the foregoing.

In operation 412, a message is sent to the wireless device, the message comprising information of a second frequency band and a third frequency band, wherein the second and third frequency bands use a second radio access technology. For example, when it is determined that a signal level of communication link 312 meets a handover criteria, a message can be sent to wireless device 302 including information about communication links 314 and 316, which use a second radio access technology. The first radio access technology can comprise a higher speed radio access technology than the second radio access technology. For example, the first radio access technology can comprise WiMAX, LTE, LTE-Advanced, or another so-called fourth generation (4G) radio access technology, and the second radio access technology can comprise CDMA, EV-DO, 1×RTT, GSM, or another so-called third generation (3G) radio access technology. In an embodiment, the message sent to the wireless device can comprise a system information block message, such as a SIB 8 message or a similar message, comprising information of a second frequency band and a third frequency band. In an embodiment, the message can further comprise a connection release message, to inform the wireless device that the communication session using the first radio access technology is being terminated.

Based on the whether the mobility meets the first or second mobility criteria, whether the application requirement meets the first or second application requirement criteria, whether the traffic class indicator meets the first or second traffic class criteria, and whether the priority type meets the first or second priority criteria, the wireless device is instructed to communicate with the access node using one of the second and third frequency bands (operation 414). For example, wireless device 302 can be instructed to communicate with access node 304 over communication link 314 or communication link 316, based on the determined mobility of wireless device 302, the determined application requirement, the determined traffic class indicator, and the determined priority type associated with wireless device 302. In an embodiment, the second frequency band (e.g., communication link 314) can comprise a primary frequency band of the second radio access technology and the third frequency band (e.g., communication link 316) can comprise a secondary frequency band of the second radio access technology.

In an embodiment, the wireless device is instructed to communicate with the access node using the second frequency band when the application requirement meets a first application requirement criteria, and instructing the wireless device to communicate with the access node using the third frequency band when the application requirement meets a second application requirement criteria. The mobility can meet the first mobility criteria when the mobility meets or exceeds a mobility threshold, such as a threshold location of the wireless device relative to the access node, a threshold direction of motion over time, and/or a threshold speed of motion over time of the wireless device, and the like. The mobility can meet the second mobility criteria when the mobility is less than a mobility threshold. Additionally, or alternatively, the wireless device is instructed to communicate with the access node using the second frequency band when the mobility meets a first mobility criteria, and instructing the wireless device to communicate with the access node using the third frequency band when the mobility meets a second mobility criteria. The application requirement can meet the first application requirement criteria when the application requirement meets or exceeds a threshold data rate, permitted data delay, throughput, error rate, data loss rate, and the like, or where the application comprises a relatively delay sensitive application. The application requirement can meet the second application requirement criteria when the application requirement is less than a threshold data rate, permitted data delay, throughput, error rate, data loss rate, and the like, or where the application comprises a relatively delay insensitive application.

Further, the wireless device can be instructed to communicate with the access node using the second frequency band when the traffic class indicator meets a first traffic class criteria, and instructing the wireless device to communicate with the access node using the third frequency band when the traffic class indicator meets a second traffic class criteria. The traffic class indicator can meet the first traffic class criteria when the traffic class indicator meets or exceeds a threshold traffic class, such as when the data traffic is associated with a guaranteed bit rate or a similar routing priority. The traffic class indicator can meet the second traffic class criteria when the application requirement is less than a threshold traffic class, such as when the data traffic is associated with a non-guaranteed bit rate or a similar routing priority. Moreover, the wireless device can be instructed to communicate with the access node using the second frequency band when the priority type meets a first priority type criteria, and instructing the wireless device to communicate with the access node using the third frequency band when the priority type meets a second priority type criteria. The priority type can meet the first priority criteria when the priority type meets or exceeds a priority threshold, such we when the priority type comprises at least a certain level of priority. The priority type can meet the second priority threshold when the priority type is less than a priority threshold.

In an embodiment, the wireless device is instructed to communicate with the access node using one of the second or third frequency band, and it is then determined that the selected frequency band is unavailable for communication by the wireless device. For example, wireless device 302 can be instructed to communicate with access node 304 over communication link 314, and it is then determined that communication link 314 is overloaded with traffic from other wireless devices. Alternatively, it can be determined that a signal strength, or a signal quality, of the second frequency band (communication link 314) is insufficient to support communications by wireless device 302. For example, the signal quality or signal strength of the second frequency band may not meet the application requirements of the application running on wireless device 302. In such case, based on the information in the message sent to the wireless device comprising the information of the second frequency band and the third frequency band, the wireless device can establish communication with the access node using the third frequency band. In other words, based on the information in the message sent to wireless device 302, wireless device 302 may not scan for additional frequency bands when it is determined that the second frequency band is unavailable for communication with access node 304, but rather wireless device 302 may establish communication with the access node using the third frequency band without scanning for other frequency bands.

Figure 5:
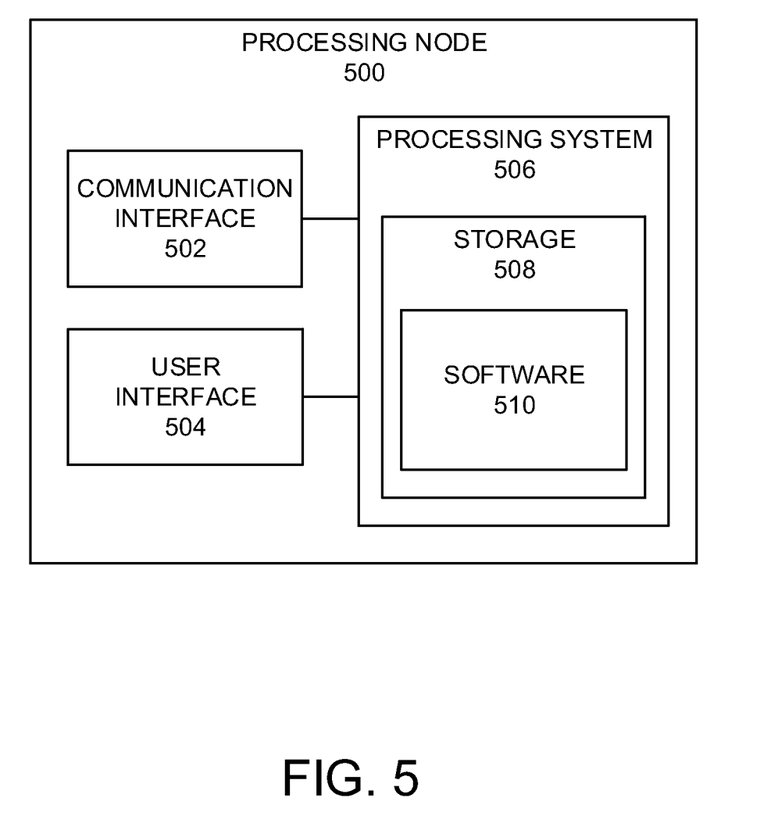
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to select a frequency band for wireless communication. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include access node 104, access node 304, controller node 306, and gateway node 308. Processing node 500 can also be an adjunct or component of a network element, such as an element of access node 104, access node 304, controller node 306, and gateway node 308. Processing node 500 can also be another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of frequency band selection using one or more network nodes in a wireless communication system, comprising:

at the one or more network nodes:
  determining a mobility of a wireless device based on a change to an assigned modulation and coding scheme over a period of time, wherein the wireless device is in communication with an access node over a first frequency band using a first radio access technology;
  determining a traffic class indicator associated with an application running on the wireless device;
  detecting that a signal level of the first frequency band meets a handover criteria;
  sending, to the wireless device, a message that includes information about a second and a third frequency bands and a connection release message, wherein the second and third frequency bands use a second radio access technology;
  based on the determined mobility and traffic class indicator, instructing the wireless device to communicate with the access node using the second frequency band of the second radio access technology;
  determining that the second frequency band of the second radio access technology is unavailable for communication by the wireless device; and,
  establishing communication between the access node and the wireless device to change to using the third frequency band based on the message.

2. The method of claim 1, wherein the second frequency band comprises a primary frequency band of the second radio access technology and the third frequency band comprises a secondary frequency band of the second radio access technology.

3. The method of claim 1, further comprising:
  instructing the wireless device to communicate with the access node using the second frequency band when the traffic class indicator meets a first traffic class criteria, and instructing the wireless device to communicate with the access node using the third frequency band when the traffic class indicator meets a second traffic class criteria.

4. The method of claim 1, further comprising:
  instructing the wireless device to communicate with the access node using the second frequency band when the mobility meets a first mobility criteria, and instructing the wireless device to communicate with the access node using the third frequency band when the mobility meets a second mobility criteria.

5. The method of claim 1, further comprising:
  determining an application requirement associated with the application running on the wireless device; and
  instructing the wireless device to communicate with the access node using the second frequency band when the application requirement meets a first application requirement criteria, and instructing the wireless device to communicate with the access node using the third frequency band when the application requirement meets a second application requirement criteria.

6. The method of claim 1, further comprising:
  determining a priority type associated with the wireless device; and
  instructing the wireless device to communicate with the access node using the second frequency band when the priority type meets a first priority type criteria, and instructing the wireless device to communicate with the access node using the third frequency band when the priority type meets a second priority type criteria.

7. The method of claim 1, wherein the handover criteria further comprises one of a signal level threshold and a signal quality threshold.

8. A method of frequency band selection using one or more network nodes in a wireless communication system, comprising:
  at the one or more network nodes:
  determining a mobility of a wireless device based on an access node triangulation, wherein the wireless device is in communication with the access node over a first frequency band using a first radio access technology;
  determining an application requirement associated with a minimum performance level of an application running on the wireless device;
  detecting that a signal level of the first frequency band meets a handover criteria;
  sending to the wireless device a message that includes information about a second frequency band and a third frequency band and a connection release message, wherein the second and third frequency bands use a second radio access technology; and
  based on the determined mobility and application requirement of the wireless device, instructing the wireless device to communicate with the access node using the second frequency band when the determined mobility meets a first mobility criteria and the application requirement meets a first application requirement criteria;
  determining that the second frequency band is unavailable for communication by the wireless device;
  instructing the wireless device to communicate with the access node using the third frequency band when the determined mobility meets a second mobility criteria and the application requirement meets a second application requirement criteria; and,
  based on the message sent to the wireless device, establishing communication between the access node and the wireless device using the third frequency band.

9. The method of claim 8, further comprising:
  determining a traffic class indicator associated with the wireless device; and
  instructing the wireless device to communicate with the access node using the second frequency band when the traffic class indicator meets a first traffic class criteria, and instructing the wireless device to communicate with the access node using the third frequency band when the traffic class indicator meets a second traffic class criteria.

10. The method of claim 8, further comprising:
  determining a priority type associated with the wireless device; and
  instructing the wireless device to communicate with the access node using the second frequency band when the priority type meets a first priority type criteria, and
  instructing the wireless device to communicate with the access node using the third frequency band when the priority type meets a second priority type criteria.

11. The method of claim 8, wherein the handover criteria further comprises one of a signal level threshold and a signal quality threshold.

12. A system of frequency band selection in a wireless communication system, comprising:
  a processing node, configured to
  determine a mobility of a wireless device based on a change to an assigned modulation and coding scheme, wherein the wireless device is in communication with an access node over a first frequency band using a first radio access technology;
  determine a traffic class indicator associated with an application running on the wireless device;

detect that a signal level of the first frequency band meets a handover criteria;

send, to the wireless device, a message that includes information about a second frequency band and a third frequency band and a connection release message, wherein the second and third frequency bands use a second radio access technology;

based on the determined mobility and traffic class indicator, instruct the wireless device to communicate with the access node using the second frequency band;

determine that the second frequency band is unavailable for communication by the wireless device; and, based on the message sent to the wireless device, establish communication between the access node and the wireless device using the third frequency band.

13. The system of claim 12, wherein the processing node is further configured to:

instruct the wireless device to communicate with the access node using the second frequency band when the traffic class indicator meets a first traffic class criteria, and instruct the wireless device to communicate with the second access node using the third frequency band when the traffic class indicator meets a second traffic class criteria.

14. The system of claim 12, wherein the processing node is further configured to:

instruct the wireless device to communicate with the access node using the second frequency band when the mobility meets a first mobility criteria, and instruct the wireless device to communicate with the access node using the third frequency band when the mobility meets a second mobility criteria.

15. The system of claim 12, wherein the processing node is further configured to:

determine an application requirement associated with the wireless device; and instruct the wireless device to communicate with the access node using the second frequency band when the application requirement meets a first application requirement criteria, and instruct the wireless device to communicate with the access node using the third frequency band when the application requirement meets a second application requirement criteria.

16. The system of claim 12, wherein the processing node is further configured to:

determine a priority type associated with the wireless device; and instruct the wireless device to communicate with the access node using the second frequency band when the priority type meets a first priority type criteria, and instruct the wireless device to communicate with the access node using the third frequency band when the priority type meets a second priority type criteria.

\* \* \* \* \*